United States Patent
Rindt et al.

(10) Patent No.: US 8,622,710 B2
(45) Date of Patent: Jan. 7, 2014

(54) WIND TURBINE COMPONENT HAVING AN ELECTRICAL LINE EMBEDDED IN A LAMINATE AND METHOD FOR MAKING THE SAME

(75) Inventors: Philipp Rindt, Rostock (DE); Dirk Austinat, Jarmen (DE)

(73) Assignee: Nordex Energy GmbH, Hamburg (DE)

( * ) Notice: Subject to any disclaimer, the term of this patent is extended or adjusted under 35 U.S.C. 154(b) by 0 days.

(21) Appl. No.: 13/492,555

(22) Filed: Jun. 8, 2012

(65) Prior Publication Data
US 2012/0315147 A1 Dec. 13, 2012

(30) Foreign Application Priority Data
Jun. 10, 2011 (DE) .......... 10 2011 105 228

(51) Int. Cl.
*F03D 11/00* (2006.01)

(52) U.S. Cl.
USPC .......................................... 416/230

(58) Field of Classification Search
USPC ................ 416/224, 230, 229 R, 39
See application file for complete search history.

(56) References Cited

U.S. PATENT DOCUMENTS

| 4,079,903 | A | * | 3/1978 | Ashton et al. ............. 244/123.5 |
| 7,494,324 | B2 | | 2/2009 | Hibbard |
| 2007/0183888 | A1 | * | 8/2007 | Gunneskov et al. ......... 415/146 |
| 2009/0257881 | A1 | | 10/2009 | Ostergaard Kristensen et al. |
| 2010/0260612 | A1 | * | 10/2010 | Vasudeva et al. ......... 416/227 R |

* cited by examiner

*Primary Examiner* — Richard Edgar
(74) *Attorney, Agent, or Firm* — Walter Ottesen P.A.

(57) ABSTRACT

A wind turbine component has a laminate of fibrous material and plastic and an electrical line embedded in the laminate, wherein a profile is arranged on a lateral surface of the electrical line, the profile counteracting the formation of a hollow space or plastic nest between the lateral surface and a fibrous material layer which covers an upper side of the electrical line during the manufacture of the laminate.

15 Claims, 3 Drawing Sheets

WIND TURBINE COMPONENT HAVING AN ELECTRICAL LINE EMBEDDED IN A LAMINATE AND METHOD FOR MAKING THE SAME

CROSS REFERENCE TO RELATED APPLICATION

This application claims priority of German patent application no. 10 2011 105 228.7, filed Jun. 10, 2011, the entire content of which is incorporated herein by reference.

FIELD OF THE INVENTION

The invention relates to a wind turbine component having a laminate of fibrous material and plastic and an electrical line embedded in the laminate. The wind turbine component can, for example, be a rotor blade or a part of a rotor blade. Such components are often manufactured from fiber reinforced plastic and typically have very large dimensions. Furthermore, during operation they are subject to very high and constantly changing loads. For this reason, electrical lines which are to be connected to such a component must be permanently and securely fixed to the component. This is often done over a great length, for example a lightning protection cable which extends from the blade tip to the blade root of a rotor blade.

BACKGROUND OF THE INVENTION

United States patent application publication 2009/0257881 discloses a rotor blade for a wind turbine having an integrated lightning protection cable. The lightning protection cable is a flat cable with a rectangular cross-section which is embedded in the laminate during manufacture of the rotor blade. For this, a vacuum injection process is used, with which the liquid plastic material is introduced between two different layers of the fibrous material after the arrangement of the lightning protection cable.

U.S. Pat. No. 7,494,324 B2 discloses a component for equalizing potential between electric conducting components of a wind turbine rotor blade. As a result of the potential equalization, an electric flashover between the components is avoided, especially in the case of a lightning strike. The component for the potential equalization includes a contact facilitating layer on which a metallic conductor is arranged. A cover layer of electric conducting fibrous material, which can be permeated with resin, is arranged over the metallic conductor. A hollow space can form between the cover layer and a lateral surface of the metallic conductor. In this patent, the suggestion is made to fill the hollow space with resin.

SUMMARY OF THE INVENTION

On the basis thereof, it is an object of the invention to provide a wind turbine component having a laminate of fibrous material and plastic and an electrical line embedded in the laminate, in which electrical lines of any cross-section can be securely and permanently fixed with a simple and/or less error-prone manufacturing process, and also a manufacturing process for such a wind turbine component.

The wind turbine component of the invention includes a laminate of fibrous material and plastic and an electrical line embedded in the laminate, wherein a profile is arranged on a lateral surface of the electrical line, said profile, during the manufacture of the laminate, counteracting the formation of a hollow space or a plastic nest between the lateral surface and a fibrous material layer which covers the upper side of the electrical line.

The invention is based on the knowledge that, in the manufacturing process described at the beginning, infusion errors can occur in the region of an embedded electrical line, and these infusion errors would require expensive reworking. In particular, hollow spaces or plastic nests can form on a lateral surface of the electrical line when a fibrous material layer which covers the electrical line cannot fully follow the cross-sectional geometry of the cable. In this case a free space, which is either completely filled with plastic and thus forms a plastic nest or is not entirely filled by the injection of the plastic so that a hollow space with an air pocket remains after the plastic has cured, is created between the lateral surface of the electrical line and the fibrous material layer which covers the electrical line. Neither of these is optimal for a permanent fixation of the line. In particular, air filled hollow spaces are critical because layers adjacent to the hollow space can form cracks under dynamic loads, and these cracks can endanger the stability of the component and the fixation of the line. For this reason, corresponding defects in the embedding of the cable must be repaired manually with a great amount of effort after the resin has cured, if this is even still possible with the often limited accessibility of the corresponding regions of the wind turbine component. A different manufacturing defect can occur when a layer of fibrous material which covers the electrical line ends up entirely or partially below the line. This can happen both during the insertion of the corresponding fiber layers into a mold and as during the evacuation of the mold during the plastic injection. A fold or a wave forms in the fibrous material, and this can also lead to problems.

In the present invention the electrical line is embedded in a laminate. Embedded means that the electrical line is cross-sectionally enclosed by the laminate on all sides. Included are arrangements in which other components of the wind turbine, in addition to the cable, for example made of balsa wood or another filling material, are also embedded in the laminate. In these cases, the electrical line can, for example, rest on such other material and be embedded in the laminate together therewith.

The fibrous material has fibers which are arranged in layers. The arrangement of the fibers within the individual layers is arbitrary. It can be, for example, unidirectional, bidirectional or unsorted. Glass fibers are often used. The use of carbon fiber is also known. The use of other plastic fibers is also conceivable. The laminate further has a plastic in which the fibers are embedded. The plastic can, for example, be polyester resin or epoxy resin or another plastic material which cures in a suitable manner.

The electrical line can be, for example, a lighting protection line, a supply line or a signal line. It can have any desired cross-section and can have shielding and/or insulation. The electrical line can have, for example, a diameter of 6 mm, 8 mm, 10 mm, 15 mm or more. It can also have a rectangular cross-section, for example with a height of 6 mm, 8 mm, 10 mm or more. The electrical line has a lateral surface. The lateral surface can be planar or curved. For example, the lateral surface can be a planar lateral surface which is formed by a short side of a rectangle or a line having a rectangular cross-section. The lateral surface can also be curved, for example in the case of a circular cable, wherein a section of the circumference forms the lateral surface. The electrical line also has an upper side which can also be planar or curved. The upper side can be formed by a section of the surface of the electrical line which is adjacent to the lateral surface.

A profile is arranged on the lateral surface of the electrical line. The profile has a defined cross-section and extends over a large length in comparison to the dimensions of the cross-section, especially corresponding to the entire length of the electrical line which is embedded in the laminate or a majority thereof.

During manufacture of the laminate, the profile counteracts the formation of a hollow space or plastic nest between the lateral surface and a fibrous material layer which covers an upper side of the electrical line. For this, the cross-section of the profile can be dimensioned such that it "conforms" directly to the electrical line in the region of the lateral surface. It can, however, also be at a distance from the lateral surface, wherein a remaining free space between the profile and the lateral surface is so small that it can generally be filled with the plastic without problems. The cross-section of the profile is matched to the cross-section of the electrical line in such a manner that at most a small free space remains between the two. Small, here, means that the free space has a cross-sectional area which is smaller than the cross-sectional area of the electrical line. It can, for example, be 20%, 10%, 5% or less of the cross-sectional area of the cable. The cross-section of the profile can be selected so that it fills, essentially fills or at least partially fills a free space between the lateral surface of the electrical line and material layer located below the electrical line.

The cross-section of the profile can be selected such that a fibrous material layer which covers the upper side of the electrical line rests against the upper side of the electrical line and against the profile. The layer of fibrous material which covers the upper side of the electrical line can also lie against a material layer which is located below the electrical line, specifically to the side of the profile. Through appropriate selection of the cross-section of the profile, all this is possible without the fibrous material layer which covers the electrical line having to have a curvature which this fibrous material layer cannot readily assume during the manufacturing of the laminate.

The upper side of the electrical line can be covered by a single- or multi-layer fibrous material. A single-layer fibrous material above the electrical line can be sufficient for permanent and secure fixation.

The invention prevents a hollow space or resin nest being created on the lateral surface of the electrical line during the manufacture of the laminate. As a result, proper and error-free embedding of the electrical lines in the laminate is ensured. As a result, the manufacturing process is more reliable and expensive reworking can be omitted.

In one embodiment, the electrical line has a lower side which rests against an essentially planar material layer in the area surrounding the electrical line. The planar material layer can be, in particular, a layer of fibrous material. The planar material layer can also be another part of the wind turbine component, such as a filling material of balsa wood or a foamed material which has an essentially planar surface. The lower side of the electrical line can lie opposite the upper side of the electrical line. The area surrounding the electrical line can extend from a middle of the electrical line in the direction of the planar material layer to the lateral surface of the electrical line and beyond. The surrounding area can have, for example, a width which corresponds to twice the diameter of the electrical line or more. In this embodiment, the profile can rest by way of a lower side against the essentially planar material layer and extend from a distance from the electrical line to the lateral surface of the electrical line. Thus, the profile counteracts the formation of the hollow space or plastic nest in the desired manner when the electrical line rests against a planar surface. In this arrangement, the danger of the formation of a hollow space or plastic nest, in particular in connection with an electrical line having a circular cross-section, is especially great.

In one embodiment, the profile has a wedge-shaped or ramp-shaped cross-section. The wedge or the ramp is formed by two surfaces, which can be planar and which abut at a sharp angle. A bottom one of these two surfaces can rest against a material layer against which a lower side of the electrical line also rests. The other of these surfaces forms a surface which slopes up toward the electrical line. It can be covered by the fibrous material layer which covers the upper side of the electrical line. In particular, this fibrous material layer can rest against this surface.

In one embodiment, the profile is made of a flexible material. In principle, the profile can also be made of a relatively stiff material, such as wood in the form of a profile strip. A flexible material can on the one hand simplify the handling even of longer profiles because these can, for example, be rolled up. On the other hand, flexibility or elasticity of the material promotes "conformation" of the profile to the lateral surface of the electrical line.

In one embodiment, the profile is made of a foamed material. In particular, it can be made of a foamed plastic material, for example a closed-pore foam. Such profiles have a low weight. Furthermore, they are not saturated by the plastic during the injection thereof, thereby further contributing to the low weight of the wind turbine component. Furthermore, they have a high elasticity and compressibility which is particularly suitable for the filling of free spaces between the electrical line and adjacent material layers.

In one embodiment, the profile has a height of 50% or more of the height of the electrical line. For example, the profile extends from a planar material layer on which the electrical line rests with its lower side, up to a height of 50%, 75%, 90% or more of the height of the electrical line. The profile can also extend exactly or at least to a height at which the electrical line has its greatest width. In the case of a circular electrical line, the profile can extend to the height of the center of the electrical line or beyond. As a result of the mentioned heights of the profile, the formation of hollow spaces or plastic nests at the lateral surfaces of the electrical line is already sufficiently counteracted in many instances.

In one embodiment, the electrical line has a circular cross-section and the cross-section of the profile has a concave section which abuts the lateral surface of the electrical line and the curvature radius of which corresponds to the radius of the electrical line. The concave section can lie opposite a tip of a wedge which forms the remainder of the cross-section or of a ramp which forms the remainder of the cross-section. The concave section can rest against the lateral surface of the electrical line. As a result, the formation of a hollow space or a plastic nest, in particular between the concave section of the profile and the electrical line, can be reliably prevented.

In one embodiment, the electrical line has a rectangular cross-section and the profile is triangular in cross-section. A lateral surface of the profile can abut a lateral surface of the electrical line. A further lateral surface of the profile can rest against a planar material layer against which a lower side of the electrical line also rests. A right angle can be formed between the two mentioned sides of the profile, and so the profile has the cross-section of a right-angled triangle.

In one embodiment, a further profile is arranged on a further lateral surface, which is opposite the lateral surface, of the electrical line, said further profile counteracting the formation of a hollow space or plastic nest between the further lateral surface and the fibrous material layer which covers the upper side during the manufacture of the laminate. Thus, profiles are arranged on two opposite lateral surfaces of the electrical line, said profiles having the above-described effect. In the case of multiple adjacently arranged electrical lines, the further lateral surface can also be a lateral surface of a further electrical line which is arranged on that side of the electrical line which is opposite the lateral surface. In this embodiment, in each case the formation of a hollow space or a plastic nest is counteracted on both sides of an electrical line or on both sides of a group of adjacent electrical lines.

In one embodiment, in addition to the electrical line, at least one further electrical line is embedded in the laminate, wherein a further profile is arranged between two of the electrical lines, said further profile counteracting the formation of hollow spaces or plastic nests between these electrical lines and/or between one of these lines and a fibrous material layer which covers the upper side during the manufacture of the laminate. Thus, a hollow space or a plastic nest otherwise possibly arising between two adjacent electrical lines is avoided.

In one embodiment, the further profile arranged between the two electrical lines has two opposite, concavely curved side edges in its cross-section. The profile can have a rectangular basic form, wherein two sides of the rectangle are formed by the two opposite, concavely curved side edges. In connection with circular electrical lines, the curvature radii of the concavely curved side edges can be matched to the radii of the electrical lines, such that the profile rests optimally against the two adjacent lateral surfaces of the electrical lines. Thus, the formation of a hollow space or plastic nest between the two adjacent lines is optimally counteracted.

In one embodiment, the wind turbine component is a rotor blade or a part of a rotor blade. For example, it can also be an upper shell or lower shell of a rotor blade made of two half shells or a strut extending between these half shells in the longitudinal direction of the rotor blade. In both cases, these are components to which an electrical line must be secured, possibly over a great length, and which are constructed of fiber reinforced plastic. Therefore, they are particularly suitable for the invention.

The object indicated above is also achieved by the method of the invention. The method of the invention is for making a wind turbine component and has the following steps:

inserting a number of bottom fibrous material layers into a mold,
placing an electrical line onto a material layer,
applying a further material layer which covers an upper side of the electrical line,
injecting a plastic in a vacuum-injection process,
curing the plastic,
removing the wind turbine component from the mold, wherein
prior to the application of the further fibrous material layer which covers the upper side of the electrical line and prior to the injection of the plastic, a profile is placed onto the material layer next to a lateral surface of the electrical line, the profile counteracting the formation of a hollow space or a plastic nest between the lateral surface and the further layer of fibrous material during the injection and curing of the plastic.

For a further description of the features of the method, reference is made to the preceding description of the wind turbine component which can be manufactured by way of the method. The explanation of the materials used and other features, and also the particular advantages of the wind turbine component apply in a corresponding manner to the method.

Vacuum-injection processes are understood as meaning processes in which fibrous materials which have not yet been saturated with the plastic are introduced into a mold. As a rule, the mold corresponds to the outer contour of the component to be manufactured. After the arrangement of the fibrous material, the electrical line and optionally other constituents to be embedded in the laminate, it is closed in an airtight manner, for example by applying a film which is fastened in a sealing manner to the edges of the mold. The liquid plastic material passes through channels and optionally further flow assistants in order to generate a vacuum or a strong negative pressure within the mold in the interior of the mold and in the process is distributed ideally in a bubble-free manner and completely, such that the fibrous material is completely saturated and any hollow spaces are filled completely with resin. In the invention, a profile is placed onto the material layer next to a lateral surface of the electrical line, thereby counteracting the formation of a hollow space or a plastic nest in the above-described manner. For this, and also for the properties of the profile and its precise arrangement in relation to the electrical line and/or the different layers of the fibrous material, reference is made to the above explanations. The material layer may be, in particular, one of the lower fibrous material layers.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
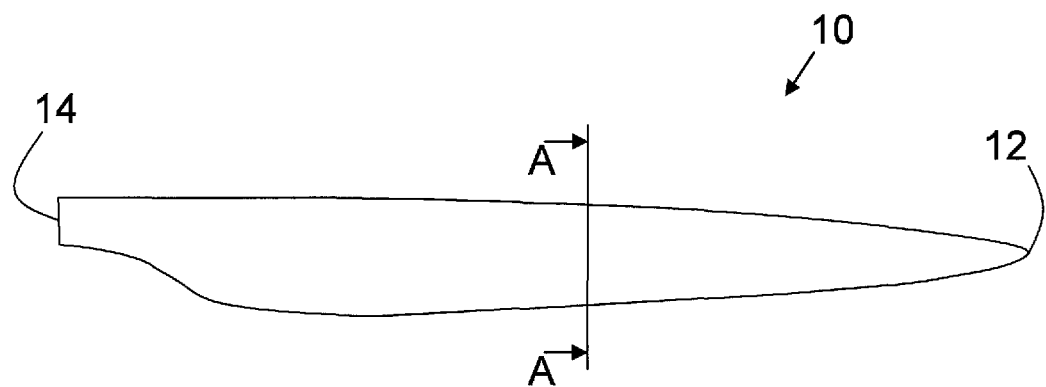
FIG. 1 shows a simplified plan view of a wind turbine rotor blade according to the invention.

FIG. 1 shows, as an example of a wind turbine component, a rotor blade 10 having a blade tip 12 and a blade root 14. The rotor blade has an aerodynamic profile, which is illustrated in cross-section in FIG. 2.

Figure 2:
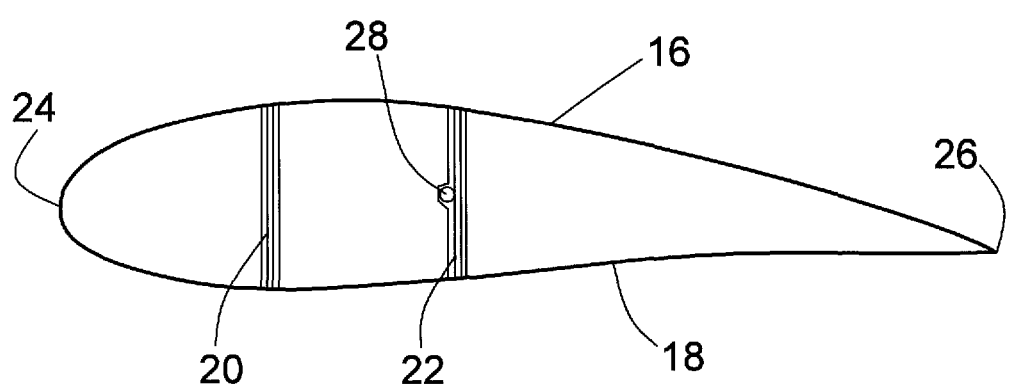
FIG. 2 shows a schematic, simplified illustration of a cross-section through the rotor blade from FIG. 1 along a line designated A-A.

In FIG. 2, it can be seen that the rotor blade from FIG. 1 is assembled from an upper shell 16 and a lower shell 18. The upper shell 16 and the lower shell 18 are each produced in a vacuum-injection process and subsequently adhesively bonded together along their nose and rear edges.

A supporting structure for this construction has two shear webs (20, 22) that extend in the longitudinal direction of the rotor blade 10. The shear web 20 is arranged further forward, toward the profile leading edge 24. The shear web 22 is located further back, as seen in the direction of flow, closer to the profile trailing edge 26.

The upper shell 16 and the lower shell 18 consist essentially, just like the shear webs 20 and 22, of a laminate which has a multiplicity of layers of fibrous material, which are embedded in a plastic. For the shear webs (20, 22), this structure of the laminate is indicated by a plurality of adjacent lines. An electrical line 28 is embedded in the laminate of the rearward shear web 22, as is illustrated in an enlarged manner in FIG. 3.

Figure 3:
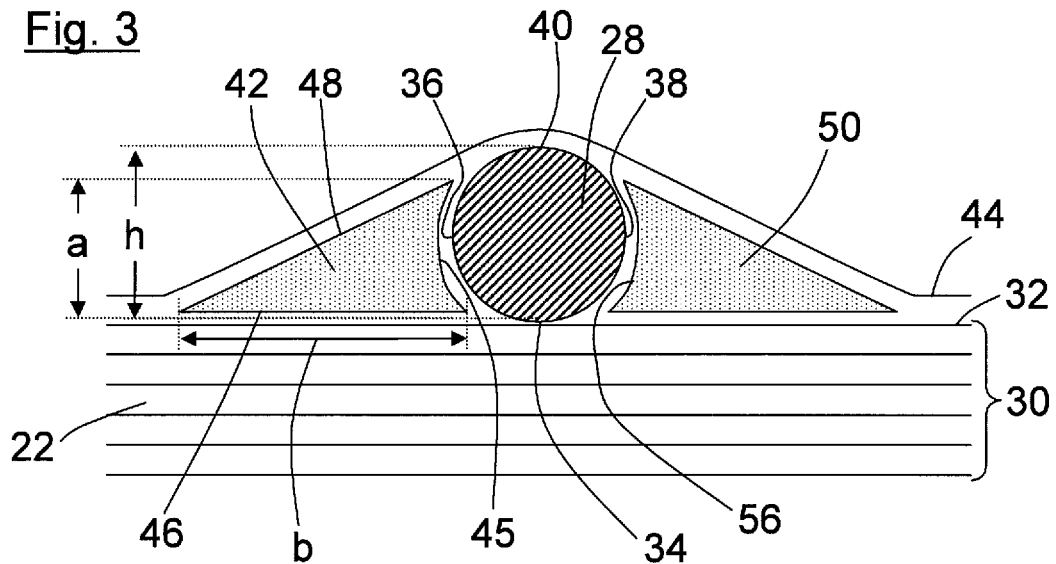
FIG. 3 shows a schematic, simplified cross-sectional illustration of an electrical line embedded according to the invention in a laminate.

The detail that can be seen in FIG. 3 shows a part of the shear web 22 having an electrical line 28 in cross-section. In the detail shown, the shear web 22 has a number of lower fibrous material layers 30, which rest against one another. The material layer 32, which is the topmost of the fibrous material layers 30, is essentially planar in an area surrounding the electrical line 28 and the electrical line 28 rests against the material layer 32 by way of a lower side 34.

The electrical line 28 is a lightning protection cable having a circular cross-section. The diameter is about 16 mm. The electrical line 28 has two opposite lateral surfaces 36 and 38 and also an upper side 40. On account of the circular cross-section, both the lateral surfaces (36, 38) and the lower side 34 and upper side 40 of the electrical line 28 are curved. They form in each case an elongate partial surface of a circular-cylinder jacket.

Arranged on the lateral surface 36 is a profile 42. The latter counteracts the formation of a hollow space or plastic nest between the lateral surface 36 and a fibrous material layer 44 which covers the upper side 40 of the electrical line 28. For this, the profile 42 has a wedge- or ramp-shaped cross-section having a lower, planar surface 46 which rests against the material layer 32, and an upper planar surface 48 which is arranged at an acute angle thereto. The fibrous material layer 44 which covers the upper side 40 of the electrical line 28 rests against this upper surface 48 and extends laterally beyond the profile 42, where the fibrous material layer 44 rests against the material layer 32. The electrical line 28 is thus completely enclosed by the material layer 32 and the fibrous material layer 44 which covers the upper side 40 of the electrical line 28, and is embedded in the laminate. The same applies to the profile 42 arranged on the lateral surface 36.

In cross-section, the profile 42 has a concave section 45, which is adjacent to the lateral surface 36 of the electrical line 28 and the curvature radius of which corresponds to the radius of the electrical line 28. The further profile 50 correspondingly has in cross-section a concave section 56 which is adjacent to the further lateral surface 38 of the electrical line 28.

Arranged on the lateral surface 38 opposite the lateral surface 36 of the electrical line 28 is a further profile 50 which is constructed in a mirror-symmetrical manner in cross-section to the profile 42.

The profile 42 has a height (a), which in the example is measured perpendicularly to the plane of the material layer 32. The height (a) is less than the height (h), corresponding to the diameter of the electrical line 28, of the electrical line 28, but greater than 50% of this height (h). The width (b) of the profile 42, measured in the direction of the material layer 32 and perpendicularly to the longitudinal direction of the electrical line 28 and of the profile 42 is approximately twice the height (a) of the profile 42.

The entire arrangement illustrated has been saturated with a plastic in a vacuum-injection process, wherein no hollow spaces that endanger the stability of the arrangement remain between the components illustrated in detail.

Figure 4:
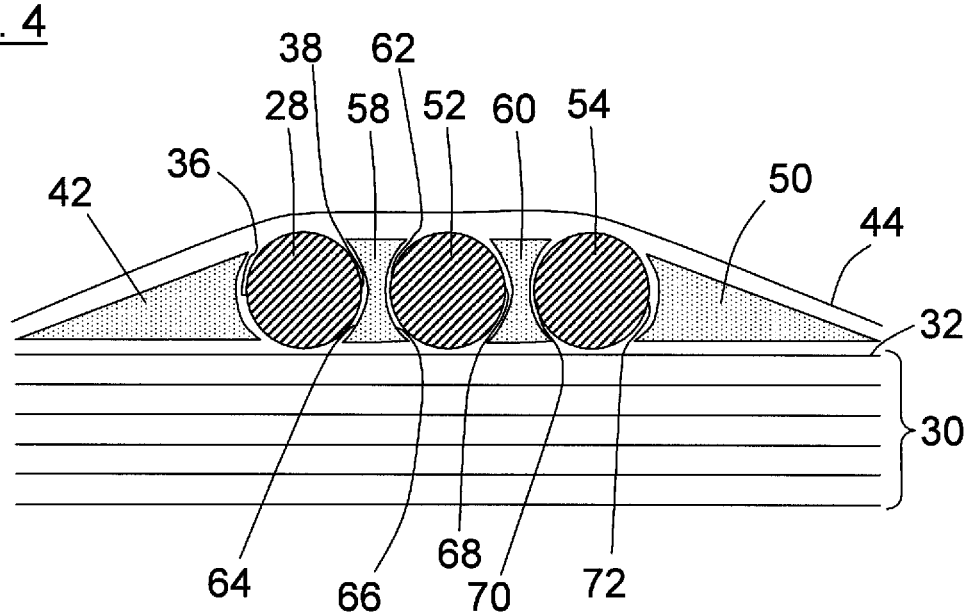
FIG. 4 shows a schematic, simplified cross-sectional illustration of three electrical lines embedded according to the invention in a laminate.
Figure 5:
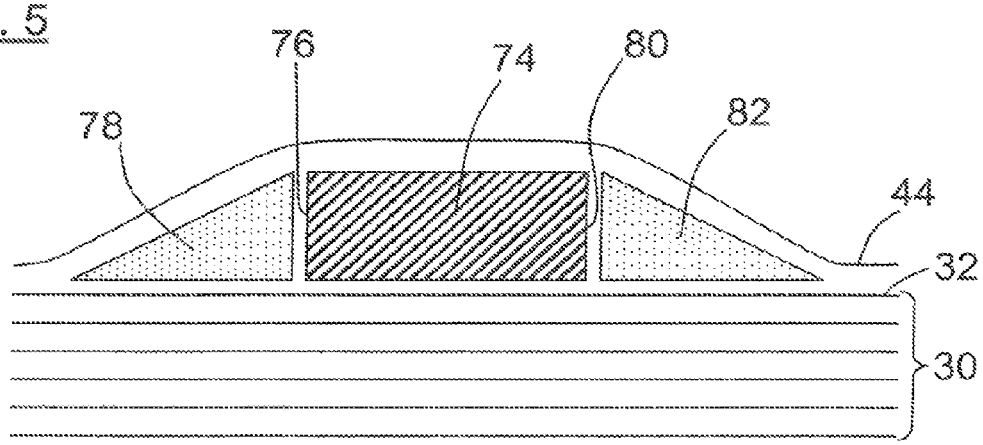
FIG. 5 shows a schematic, simplified cross-sectional illustration of an electrical line, having a rectangular cross-section, embedded according to the invention in a laminate; and, FIG. 6 shows a laminate having an embedded electrical line according to the prior art.

FIG. 4 illustrates a further exemplary embodiment, wherein the same reference signs as in FIG. 3 are used for corresponding components, as is the case also in FIG. 5. The exemplary embodiment in FIG. 4 differs from that in FIG. 3 in that two further electrical lines 52 and 54 are arranged next to the electrical line 28. A profile 42 is arranged on the lateral surface 36 of the electrical line 28 in the manner already described. On that side of the electrical line 28 that is opposite the lateral surface 36, there are two further electrical lines (52, 54). Between the electrical line 28 and the further electrical line 52 there is a further profile 58 which has a rectangular basic form in cross-section, wherein two opposite sides of the rectangle which are adjacent to the lateral surfaces 38 and 62 of the electrical lines 28 and 52, respectively, are formed by concavely curved surfaces (64, 66).

Between the further electrical lines (52, 54) there is arranged a further profile 60, which has the same cross-section as the profile 58. It is adjacent to a further lateral surface 68 of the electrical line 52 and a lateral surface 70 of the further electrical line 54. On a further lateral surface 72 of the electrical line 54 there is arranged a further profile 50 which is formed in a manner corresponding to the further profile 50 from FIG. 3.

The entire arrangement of the electrical lines (28, 52, 54) and the profiles (42, 58, 60, 50) is covered by a layer of fibrous material 44.

FIG. 5 shows, as a further exemplary embodiment, a laminate in which an electrical line 74 having a rectangular cross-section is embedded. In this case, the electrical line 74 has a planar lateral surface 76 on which a profile 78 is arranged. The profile 78 has the cross-section of a right-angled triangle. On a further lateral surface 80, opposite the lateral surface 76 of the electrical line 74, there is arranged a further profile 82. The arrangement of the electrical line 74 and the two profiles (78, 82) rests on a topmost, planar material layer 32 of the fibrous material layers 30 and is covered by a layer of fibrous material 44.

Figure 6:
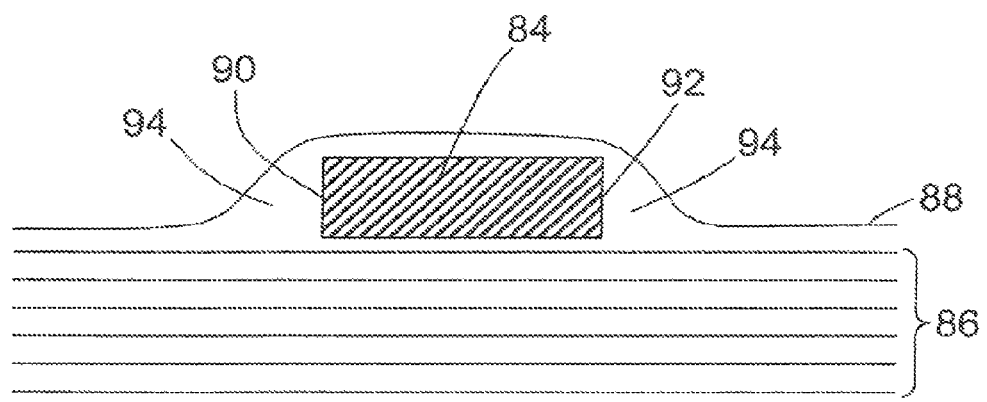

FIG. 6 illustrates the problem that exists in the prior art. Illustrated is an electrical line 84 having a rectangular cross-section, said electrical line 84 being embedded in a laminate. It rests on a number of fibrous material layers 86. Furthermore, it is covered by a further fibrous material layer 88. Between the lateral surfaces (90, 92) of the electrical line 84 and the fibrous material layer 88 covering the electrical line 84, hollow spaces 94 have formed during the manufacture of the laminate.

It is understood that the foregoing description is that of the preferred embodiments of the invention and that various changes and modifications may be made thereto without departing from the spirit and scope of the invention as defined in the appended claims.

LIST OF REFERENCE SIGNS

10 Rotor blade
12 Blade tip
14 Blade root
16 Upper shell
18 Lower shell
20 Forward shear web
22 Rearward shear web
24 Profile leading edge
26 Profile trailing edge
28 Electrical line
30 Lower fibrous material layers
32 Material layer
34 Lower side of the electrical line 28
36 Lateral surface of the electrical line 28
38 Further lateral surface of the electrical line 28
40 Upper side of the electrical line 28
42 Profile
44 Covering fibrous material layer
45 Concave section of the profile 42
46 Lower surface of the profile 42

48 Upper surface of the profile 42
50 Further profile
52 Further electrical line
54 Further electrical line
56 Concave section of the further profile 50
58 Further profile
60 Further profile
62 Lateral surface of the further electrical line 52
64 Concave surface of the profile 58
66 Further concave surface of the profile 58
68 Further lateral surface of the electrical line 52
70 Lateral surface of the electrical line 54
72 Further lateral surface of the electrical line 54
74 Electrical line
76 Lateral surface of the electrical line 74
78 Profile
80 Further lateral surface of the electrical line 74
82 Further profile
84 Electrical line
86 Lower fibrous material layers
88 Covering fibrous material layer
90 Lateral surface of the electrical line 84
92 Further lateral surface of the electrical line 84
94 Hollow space or resin nest

What is claimed is:

1. A wind turbine component comprising:
a laminate of fibrous material and plastic;
an electrical cable having a lateral surface, an upper side and a lower side and being embedded in said laminate;
said laminate including a fibrous material cover layer and a plurality of lower fibrous material layers;
said plurality of lower fibrous material layers including a topmost lower fibrous material layer disposed beneath said cover layer;
said lower side of the electrical cable resting on the topmost lower fibrous material layer;
said cover layer being arranged so as to cover said upper side of said electrical cable; and,
a profile arranged on said lateral surface and configured to counteract a formation of a hollow space or a plastic nest between said lateral surface and said fibrous material cover layer during the manufacture of said laminate; and,
said cover layer extending laterally beyond said profile and resting against said topmost lower fibrous material layer.

2. The wind turbine component of claim 1, wherein:
said topmost lower fibrous material layer is an essentially planar material layer in an area of said electrical cable; and,
said electrical cable has a lower side which rests against said essentially planar material layer.

3. The wind turbine component of claim 1, wherein said profile has a cross-section which is wedge-shaped.

4. The wind turbine component of claim 1, wherein said profile has a cross-section which is ramp-shaped.

5. The wind turbine component of claim 1, wherein said profile is made of a flexible material.

6. The wind turbine component of claim 1, wherein said profile is made of a foamed material.

7. The wind turbine component of claim 1, wherein:
said electrical cable has a height (h);
said profile has a height (a); and,
said height (a) of said profile is at least 50% of said height (h) of said electrical cable.

8. The wind turbine component of claim 1, wherein:
said electrical cable has a circular cross-section and a first curvature radius;
said profile has a cross-section having a concave section with a second curvature radius;
said concave section of said profile is arranged so as to border on said lateral surface of said electrical cable and,
said second curvature radius of said concave section of said profile corresponds to said first curvature radius of said electrical cable.

9. The wind turbine component of claim 1, wherein:
said electrical cable has a rectangular cross-section; and,
said profile has a triangular cross-section.

10. The wind turbine component of claim 1, wherein said electrical cable has a further lateral surface arranged adjacent to said lateral surface, said wind turbine component further comprising:
a further profile arranged on said further lateral surface; and,
said further profile being configured to counteract a formation of a hollow space or a plastic nest between said further lateral surface and said fibrous material cover layer during the manufacture of said laminate.

11. The wind turbine component of claim 1, wherein said electrical cable is a first electrical cable and said profile is a first profile, said wind turbine component further comprising:
at least a second electrical cable;
said second profile arranged between said first electrical cable and said second electrical cable; and,
said second profile being configured to, during the manufacture of said laminate, counteract a formation of a hollow space or plastic nest between said first electrical cable and said second electrical cable and/or between one of said first and second electrical cables and said fibrous material cover layer.

12. The wind turbine component of claim 11, wherein said second profile has a cross-section having two concavely curved side edges lying opposite one another.

13. The wind turbine component of claim 1, wherein said wind turbine component is one of a rotor blade and a part of a rotor blade.

14. The wind turbine component of claim 1, wherein said wind turbine component was manufactured in a vacuum injection process.

15. A method for making a wind turbine component comprising the steps of:
inserting a plurality of fibrous material layers including a topmost lower fibrous material layer into a mold;
placing an electrical cable having a lateral surface onto the topmost lower fibrous material layer;
placing a profile next to the lateral surface of the electrical cable on the topmost lower fibrous material layer on which the electrical cable was placed to counteract a formation of a hollow space or a plastic nest between said lateral surface and said topmost lower fibrous material layer during the manufacture of said laminate;
applying a cover fibrous material layer which covers an upper side of the electrical cable and which extends laterally beyond said profile and rests against said topmost lower fibrous material layer;
injecting a plastic in a vacuum injection process;
curing the plastic; and,
removing the wind turbine component from the mold.

* * * * *

UNITED STATES PATENT AND TRADEMARK OFFICE
CERTIFICATE OF CORRECTION

| | | |
|---|---|---|
| PATENT NO. | : 8,622,710 B2 | |
| APPLICATION NO. | : 13/492555 | |
| DATED | : January 7, 2014 | |
| INVENTOR(S) | : Philipp Rindt and Dirk Austinat | |

It is certified that error appears in the above-identified patent and that said Letters Patent is hereby corrected as shown below:

In the Specification

In Column 2:
Line 52: delete "lighting" and insert -- lightning -- therefor.

In the Claims

In Column 10:
Line 7: delete "cable" and insert -- cable; -- therefor.

Signed and Sealed this
Twentieth Day of May, 2014

Michelle K. Lee
*Deputy Director of the United States Patent and Trademark Office*